(12) United States Patent
Machino

(10) Patent No.: US 8,050,859 B2
(45) Date of Patent: Nov. 1, 2011

(54) NAVIGATION APPARATUS

(75) Inventor: Hiroshi Machino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 341 days.

(21) Appl. No.: 12/442,051

(22) PCT Filed: Oct. 5, 2007

(86) PCT No.: PCT/JP2007/069613
§ 371 (c)(1),
(2), (4) Date: Mar. 19, 2009

(87) PCT Pub. No.: WO2008/068954
PCT Pub. Date: Jun. 12, 2008

(65) Prior Publication Data
US 2009/0248294 A1 Oct. 1, 2009

(30) Foreign Application Priority Data
Dec. 4, 2006 (JP) ................................ 2006-327401

(51) Int. Cl.
*G01C 21/00* (2006.01)
(52) U.S. Cl. ......... 701/202; 701/200; 701/201; 701/213
(58) Field of Classification Search ........................ None
See application file for complete search history.

(56) References Cited

U.S. PATENT DOCUMENTS

| | | | |
|---|---|---|---|
| 5,910,177 A | 6/1999 | Zuber | |
| 6,295,503 B1 | 9/2001 | Inoue et al. | |
| 6,480,769 B1 * | 11/2002 | Kageyama | 701/23 |
| 2001/0021895 A1 * | 9/2001 | Yamazaki | 701/211 |
| 2003/0033080 A1 * | 2/2003 | Monde et al. | 701/201 |
| 2005/0055158 A1 | 3/2005 | Machino | |
| 2005/0071080 A1 | 3/2005 | Sano | |

FOREIGN PATENT DOCUMENTS

| | | |
|---|---|---|
| DE | 69728501 T2 | 4/2005 |
| DE | 102004032194 A1 | 4/2005 |
| JP | 2000-131085 A | 5/2000 |
| JP | 2001-183159 A | 7/2001 |
| JP | 2001-330459 A | 11/2001 |
| JP | 2004-157125 A | 6/2004 |
| JP | 2004-185504 A | 7/2004 |
| JP | 2005-061988 A | 3/2005 |
| JP | 2005-083758 A | 3/2005 |
| WO | WO-02/061377 A1 | 8/2002 |

* cited by examiner

*Primary Examiner* — Khoi Tran
*Assistant Examiner* — Bao Long T Nguyen
(74) *Attorney, Agent, or Firm* — Birch, Stewart, Kolasch & Birch, LLP

(57) ABSTRACT

A navigation apparatus includes a route searching unit 130 for searching for a route from a current position determined by a current position determining means to a destination inputted by an input unit on the basis of map data acquired by a map data acquiring means, and for, when a road where a car pool lane is also provided is included in a route acquired through the route search, presenting, as a recommended route, the route using the car pool lane if the distance from an entrance of the road to an entrance of the car pool lane is equal to or longer than a predetermined value, or if the distance from an exit of the car pool lane to an exit of the road is equal to or longer than a predetermined value.

3 Claims, 5 Drawing Sheets

FIG. 5

| HOV Setting | | | Map | |
|---|---|---|---|---|
| | Entrance | | Exit | |
| Distance Restriction : | Yes | No | Yes | No |
| Distance : | ◄ Akm ► | | ◄ Bkm ► | |
| Number of Lanes : | ◄ Five Lanes ► | | ◄ Five Lanes ► | |
| Vehicle Type : | ◄ Track ► | | ◄ Track ► | |
| Day of Week Setting : | ◄ Weekday ► | | ◄ Weekday ► | |
| Time Zone Setting : | ◄ 7:00 ► | | ◄ 17:00 ► | |
| | ≀ | | ≀ | |
| | ◄ 12:00 ► | | ◄ 19:00 ► | |

Enter | Initial Setting | Return

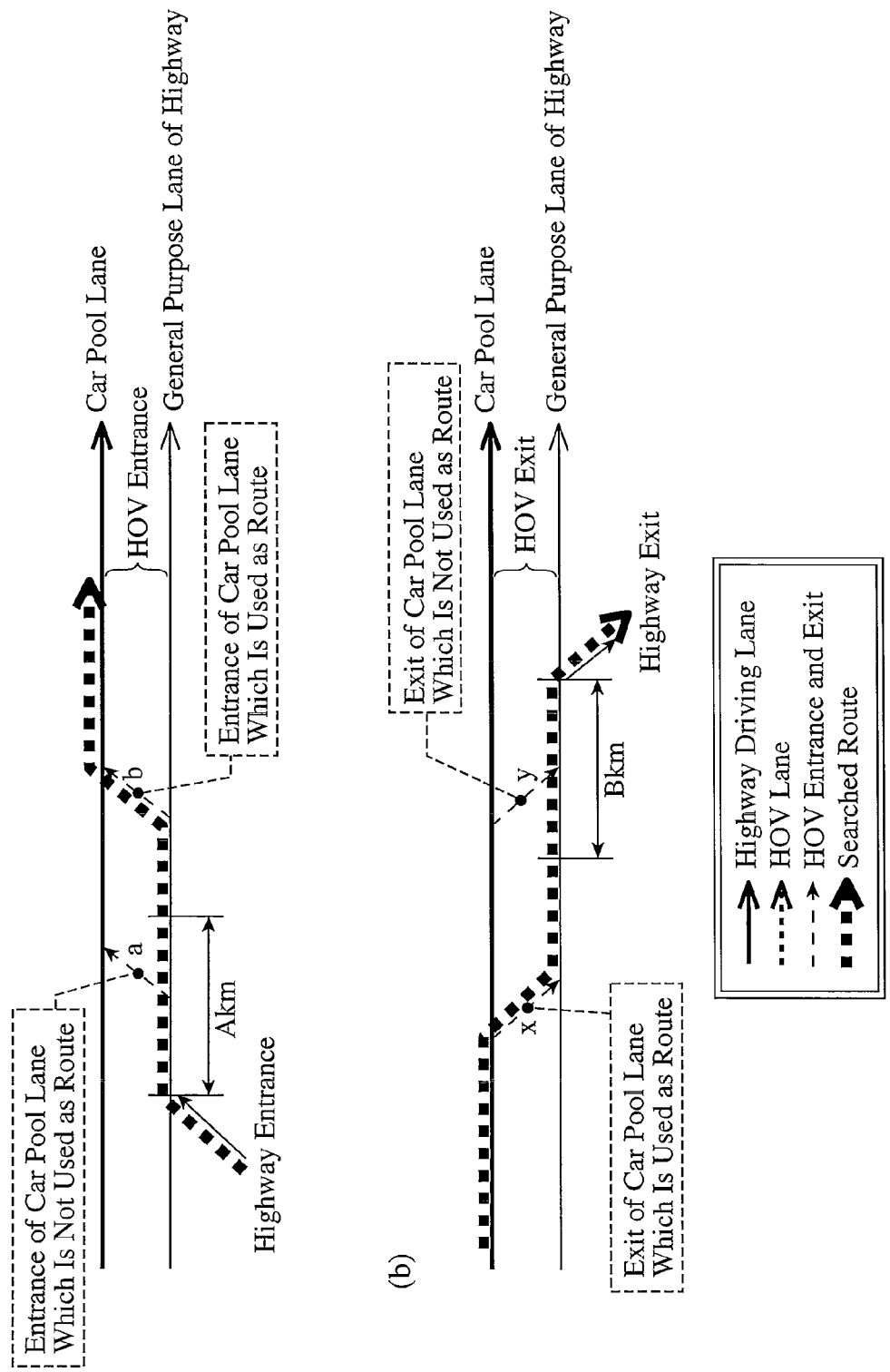

NAVIGATION APPARATUS

FIELD OF THE INVENTION

The present invention relates to a navigation apparatus which performs a search for a route including a car pool lane. More particularly, it relates to a technology of performing a search for a route in consideration of a car pool lane and each gate of a road where this car pool lane is also provided.

BACKGROUND OF THE INVENTION

A conventional navigation apparatus displays the current position of a vehicle which is determined by a vehicle position determining unit on a digital map (simply referred to as a "map" from here on) displayed on a display unit while superimposing the current position on the map. Furthermore, the conventional navigation apparatus searches for a recommended route from the current position of the vehicle which is determined by the vehicle position determining unit to a destination inputted via an input unit, and displays the recommended route on the map. The conventional navigation apparatus then carries out a route guidance of the recommended route on the basis of the shapes of road links read from a recording medium.

By the way, recent years have seen increase in the number of cars owned by individuals and occurrence of traffic congestions in various places of roads. Especially, most of vehicles travelling along a highway or expressway (simply referred to as a "highway" from here on in this specification) which is extending toward a big city and which is used for commuting or the like are occupied by only one person and this results in increase in traffic congestions. In order to solve this problem, there have been constructed highways where traffic is restricted by law according to the conditions of vehicles including the number of passengers and vehicle types.

For example, a car pool lane (Car Pool Lane) which is adopted by a road system mainly seen in big cities of North American is an example. A car pool lane is also called an HOV lane (High Occupancy Vehicle Lane), and is a lane along which, for example, only vehicles in each of which two or more persons are riding are granted to travel. For example, a lane which is also provided on a highway is known as a car pool lane. A road system which adopts such a car pool lane provides users with a preferential treatment that makes it possible to arrive at the destination in a shorter time when they travel along a car pool lane so as to prod users to share a vehicle with one or more persons, thereby reducing the traffic as a whole and therefore reducing traffic congestions.

As a technology relevant to such a car pool lane, patent reference 1 discloses a vehicle-mounted navigation apparatus which searches for a recommended route in consideration of the number of passengers. This vehicle-mounted navigation apparatus has a storage unit for storing map data including link data about each link which constructs a road on a map. As for a car pool link on which restrictions of prohibiting a vehicle which are not occupied by two or more persons from traveling are imposed, the vehicle-mounted navigation apparatus uses link data including information showing that such restrictions are imposed on the car pool link to search for a recommended route from the place of departure to the destination. Furthermore, when a car pool link is included in the constitution links which construct the recommended route, the vehicle-mounted navigation apparatus receives an input of the number of passengers, and searches for a recommended route from the place of departure to the destination by using the link data to exclude links along which the vehicle cannot travel because the received number of passengers does not meet a certain criterion.

Patent reference 2 discloses a route searching apparatus which can perform a search for a route in consideration of the conditions of a vehicle through an easy operation. This route searching apparatus is provided with a map data acquiring unit for acquiring map data defined by nodes and road links, a route searching unit for searching for a route to a destination before the conditions of the vehicle are set up, taking into consideration a road link corresponding to a particular road for which whether or not the vehicle can travel according to the conditions of the vehicle is determined, the road link being included in the map data acquired by the map data acquiring unit, and an output unit for outputting the route searched for by the route searching unit.

[Patent reference 1] JP, 2005-061988, A
[Patent reference 2] JP, 2005-083758, A

In many cases, a car pool lane currently provided is disposed as a central one of a plurality of lanes of a highway. A problem is therefore that when a vehicle enters a highway from a local street via an entrance of the highway or a connection road to the highway and then enters a car pool lane from a general purpose lane of the highway, the vehicle has to cross a plurality of driving lanes of the highway along which many vehicles are travelling at a high speed until entering the car pool lane, and this entails danger to the driver of the vehicle and forces the driver to do a burdensome driving operation. Furthermore, because the number of vehicles which are travelling along a highway at a high speed changes greatly depending on what day of the week it is or what time zone it is, and low-acceleration vehicles and large-sized vehicles also travel along a highway, it is dangerous to cross a plurality of driving lanes during travel over a short distance. This problem similarly arises in a case in which a vehicle goes out of a car pool lane to a highway via an exit of the car pool lane, crosses a general purpose lane of the highway, and then goes out of the highway to a local street via an exit or a connection road of the highway.

However, no measures against the above-mentioned problem are taken in conventional navigation apparatuses, and conventional navigation apparatuses simply perform a search for a route including a car pool lane as a part thereof. Therefore, the problem that when a vehicle uses a car pool lane, that is, when a vehicle enters a car pool lane from a local street via general purpose lanes of a highway, and then goes out of the car pool lane to a local street via general purpose lanes of the highway, the vehicle has to cross a plurality of driving lanes of the highway, and this entails danger to the driver of the vehicle and also forces the driver to do a burdensome driving operation is left behind.

The present invention is made in order to solve the above-mentioned problem, and it is therefore an object of the present invention to provide a navigation apparatus which can provide a recommended route which enables the user to use a car pool lane safely for the user.

DISCLOSURE OF THE INVENTION

In order to solve the above-mentioned problem, a navigation apparatus in accordance with the present invention includes a map data acquiring means for acquiring map data including data about roads for which whether or not a car pool lane is also provided is specified; a current position determining means for determining a current position; an input unit for inputting a destination; and a route searching unit for searching for a route from the current position determined by the current position determining means to the destination inputted by the input unit on a basis of the map data acquired by the map data acquiring means, and for, when a road where a car pool lane is also provided is included in a route which the route searching unit has acquired through the search, presenting, as a recommended route, the route using the car pool lane if a distance from an entrance of the road to an entrance of the car pool lane is equal to or longer than a predetermined value, or if a distance from an exit of the car pool lane to an exit of the road is equal to or longer than a predetermined value.

Because the navigation apparatus in accordance with the present invention is constructed in such a way as to, when a road where a car pool lane is also provided is included in a route acquired through the route search, present, as a recommended route, the route using the car pool lane if the distance from an entrance of the road to an entrance of the car pool lane is equal to or longer than the predetermined value, or if the distance from an exit of the car pool lane to an exit of the road is equal to or longer than the predetermined value, the navigation apparatus does not present the car pool lane as the recommended route when the distance from the entrance of the road to the entrance of the car pool lane is equal to or longer than the predetermined value, or when the distance from the exit of the car pool lane to the exit of the road is equal to or longer than the predetermined value. Therefore, because there does not occur a case in which the user drives his or her vehicle to cross a plurality of driving lanes and enter a car pool lane or to go out of a car pool lane during travel over a short distance (a constant distance), as long as the user drives the vehicle along the recommended route, the user can use the car pool lane safely.

BRIEF DESCRIPTION OF THE FIGURES

FIG. 5 is a view showing an example of a car pool lane setup screen which is displayed in the navigation apparatus in accordance with Embodiment 1 of the present invention; and FIG. 6 is a view for explaining a route search using a car pool lane in the navigation apparatus in accordance with Embodiment 1 of the present invention.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
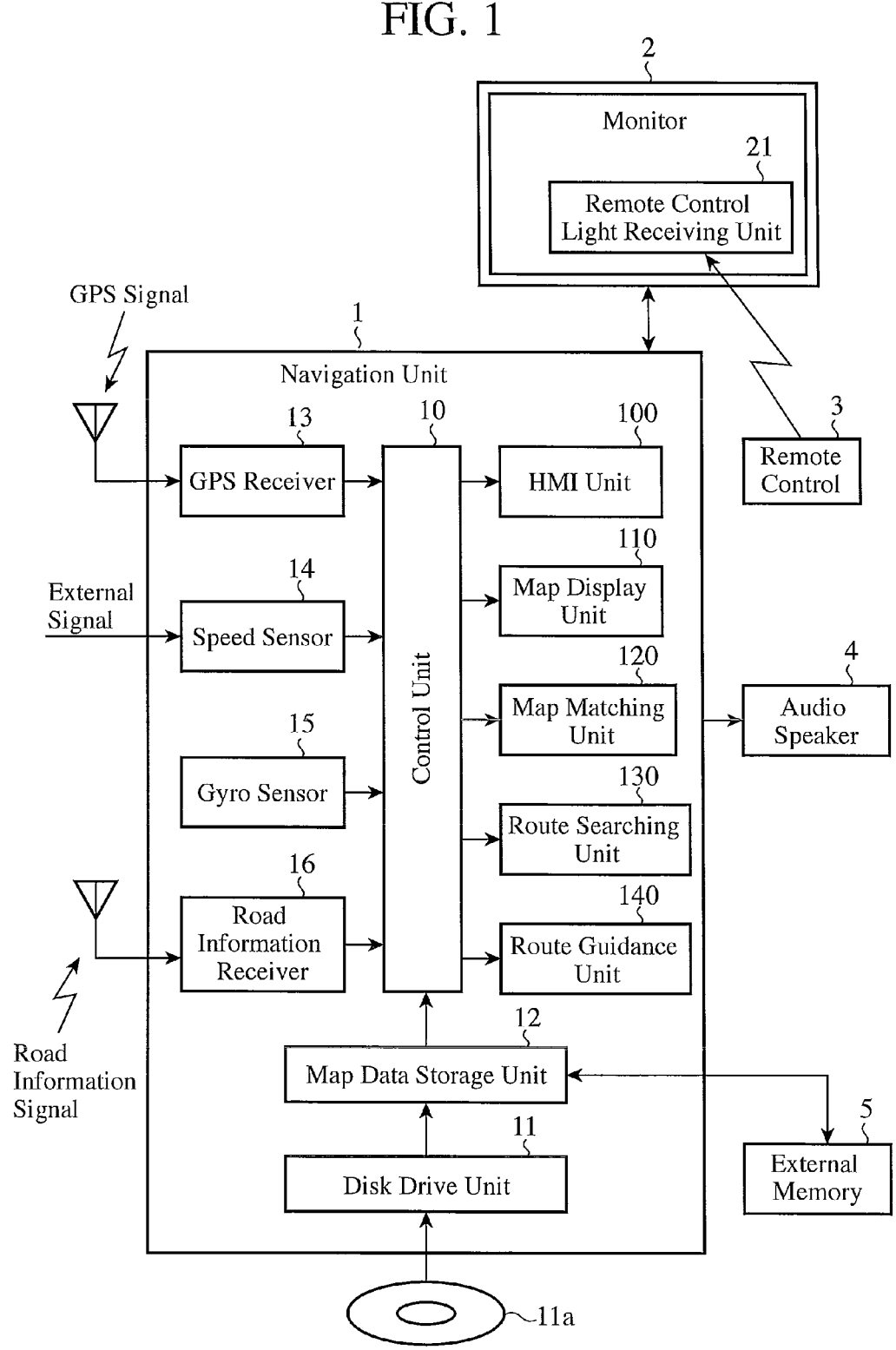
FIG. 1 is a block diagram showing the structure of a navigation apparatus in accordance with Embodiment 1 of the present invention.

FIG. 1 is a block diagram showing the structure of a navigation apparatus in accordance with Embodiment 1 of the present invention. This navigation apparatus is comprised of a navigation unit 1, a monitor 2, a remote controller (abbreviated as a "remote control" from here on) 3, an audio speaker 4, and an external memory 5.

The navigation unit 1 forms the heart of the navigation apparatus, and carries out processes, such as a map display, a route search, a route display, and a route guidance. Especially, a process of performing a search for a route while judging whether to use a car pool lane as a recommended route, which is a feature of the present invention, is also performed by this navigation unit 1. The details of this navigation unit 1 will be mentioned below.

The monitor 2 is comprised of, for example, an LCD (Liquid Crystal Display), and displays a map, a vehicle position mark, a recommended route to a destination, and various other messages according to display data sent thereto from the navigation unit 1. A remote control light receiving unit 21 is disposed in this monitor 2. The remote control light receiving unit 21 receives a light signal sent thereto from the remote control 3, and sends the light signal, as an input signal, to the navigation unit 1 via the monitor 2.

The remote control 3 corresponds to an input unit and a setting means of the present invention, and is used by the user to scroll a map displayed on the monitor 2, to input a destination, to set up either a required distance from an entrance of a highway where a car pool lane is also provided to an entrance of the car pool lane or a required distance from an exit of a car pool lane to an exit of a highway where the car pool lane is also provided, and to answer a message for urging the user to do a certain operation which is outputted from the monitor 2 or the audio speaker 4. Instead of the remote control 3 or together with the remote control 3, a touch panel can be disposed for enabling the user to directly touch a touch sensor mounted on the screen of the monitor 2 to input various pieces of information.

The audio speaker 4 outputs, by voice, a route guidance message including a guidance about car pool lanes according to audio data sent thereto from the navigation unit 1. The external memory 5 is optional, and is comprised of, for example, an HDD (Hard Disk Drive). Map data similar to map data stored in a recording medium 11a inserted into a disk drive unit 11 which will be mentioned below are stored in this external memory 5. Use of this external memory 5 makes it possible to access the map data at a high speed, as well as to store a lot of map data.

Next, the details of the navigation unit 1 will be explained. The navigation unit 1 is comprised of a control unit 10, the disk drive unit 11, a map data storage unit 12, a GPS (Global Positioning System) receiver 13, a speed sensor 14, a gyro sensor 15, a road information receiver 16, a human-machine interface (abbreviated as an "HMI" from here on) unit 100, a map display unit 110, a map matching unit 120, a route searching unit 130, and a route guidance unit 140.

The control unit 10 is comprised of, for example, a microcomputer, and controls the whole of this navigation unit 1. The HMI unit 100, the map display unit 110, the map matching unit 120, the route searching unit 130, and the route guidance unit 140 are comprised of an application program which operates under the control of this microcomputer.

When the recording medium 11a, such as a DVD (Digital Versatile Disc) or a CD (Compact Disc), in which a map database including map data is stored is inserted thereinto, the disk drive unit 11 plays back a content recorded in the recording medium. The map data are defined by nodes, road links, etc., and include link information, such as intersection construction links, destination area data, car pool lane data, and road number data. Whether or not a car pool lane is also provided is specified in a road link.

Car pool lane data include lane information (the position of a car pool lane in all lanes), information about the types of vehicles which can use the car pool lane (e.g., a general vehicle, a bus, a track, an emergency vehicle, a hybrid vehicle, a motorcycle, and so on), information about the number of passengers which is required of the user to use the car pool lane, information about dates or days of the week on which vehicles can use the car pool lane, and a time zone in which vehicles can use the car pool lane, information about the toll fee of using the car pool lane, etc. The map data played back by this disk drive unit 11 are sent to the map data storage unit 12.

The map data storage unit 12 temporarily stores the map data sent thereto from the disk drive unit 11 or the external memory 5. A map data acquiring means in accordance with the present invention is comprised of either the disk drive unit 11 to which the recording medium 11*a* is mounted or the external memory 5, and the map data storage unit 12. The map data stored in this map data storage unit 12 are used for display of information about a car pool lane, a map, roads, various icons, other information, etc., a route search, a route guidance, etc.

The GPS receiver 13 detects the current position of the vehicle on the basis of GPS signals from GPS satellites which are received via an antenna. Current position data showing the current position of the vehicle detected by this GPS receiver 13 are sent to the control unit 10. The speed sensor 14 detects the traveling speed of the vehicle on the basis of an external signal sent thereto from the vehicle in which this navigation apparatus is mounted. Speed data showing the traveling speed of the vehicle detected by this speed sensor 14 are sent to the control unit 10.

The gyro sensor 15 detects the traveling direction of the vehicle. Direction data showing the traveling direction of the vehicle detected by this gyro sensor 15 are sent to the control unit 10. The control unit 10 detects the current position of the vehicle with self-contained navigation on the basis of the speed data sent thereto from the speed sensor 14 and the direction data sent thereto from the gyro sensor 15. Because the navigation apparatus can detect the current position of the vehicle with self-contained navigation even if the navigation apparatus cannot detect the current position of the vehicle using the GPS receiver 13 when, for example, the vehicle is running through a tunnel, the navigation apparatus can always detect the current position of the vehicle correctly. A current position determining means in accordance with the present invention is comprised of the GPS receiver 13, the speed sensor 14, the gyro sensor 15, and the control unit 10 which processes data sent thereto from these components.

The road information receiver 16 receives a road information signal transmitted from, for example, an external road traffic data communications system. The road information signal received by this road information receiver 16 is sent to the control unit 10. The control unit 10 generates a message showing congestion information about congestion on roads on the basis of the road information signal received from the road information receiver 16, and notifies the message to the user via the monitor 2 and the audio speaker 4.

Under the control of the control unit 10, the HMI unit 100 processes either a command which is generated when the user manipulates a not-shown control panel or a command sent thereto, as an input signal, from the remote control 3 via the monitor 2 including the remote control light receiving unit 21. This HMI unit 100 carries out communications between the navigation apparatus and the user.

The map display unit 110 generates drawing data for making the monitor 2 display a map, an intersection guidance figure, information about a car pool lane, a telop for notifying various pieces of information to the user, etc. under the control of the control unit 10. The drawing data generated by this map display unit 110 are sent to the monitor 2 as display data, so that a map, a vehicle position mark, a recommended route to the destination, an intersection guidance figure, information about a car pool lane, etc. are displayed on the screen of the monitor 2.

Under the control of the control unit 10, the map matching unit 120 associates the vehicle position which is generated on the basis of either the current position data from the GPS receiver 13 or the current position data detected with autonomous navigation with the map shown by the map data read from the map data storage unit 12 so as to form a vehicle position mark on the map.

Under the control of the control unit 10, the route searching unit 130 searches for a recommended route from the current position of the vehicle to the destination which the user has set up by using the remote control 3 according to search conditions and car pool lane use conditions which the user has set up by using the remote control 3. This route searching unit 130 can perform both a search for a route which enables use of car pool lanes and a search for a route which disables use of car pool lanes.

When performing a search for a route which enables use of car pool lanes, if a highway where a car pool lane is also provided is included in the route acquired through the route search and the distance from an entrance of the highway to an entrance of the car pool lane is equal to or longer than a predetermined value A and the distance from an exit of the car pool lane to an exit of the highway is equal to or longer than a predetermined value B, this route searching unit 130 presents the route which uses the car pool lane as a recommended route to the user (this process will be mentioned below in detail).

Irrespective of whether the vehicle will travel along the recommended route acquired through the route search performed by the route searching unit 130, the route guidance unit 140 generates a route guidance figure and a voice guidance message including the information about a car pool lane as the vehicle travels. The route guidance figure is displayed on the monitor 2, and the voice guidance message is outputted from the audio speaker 4.

Figure 2:
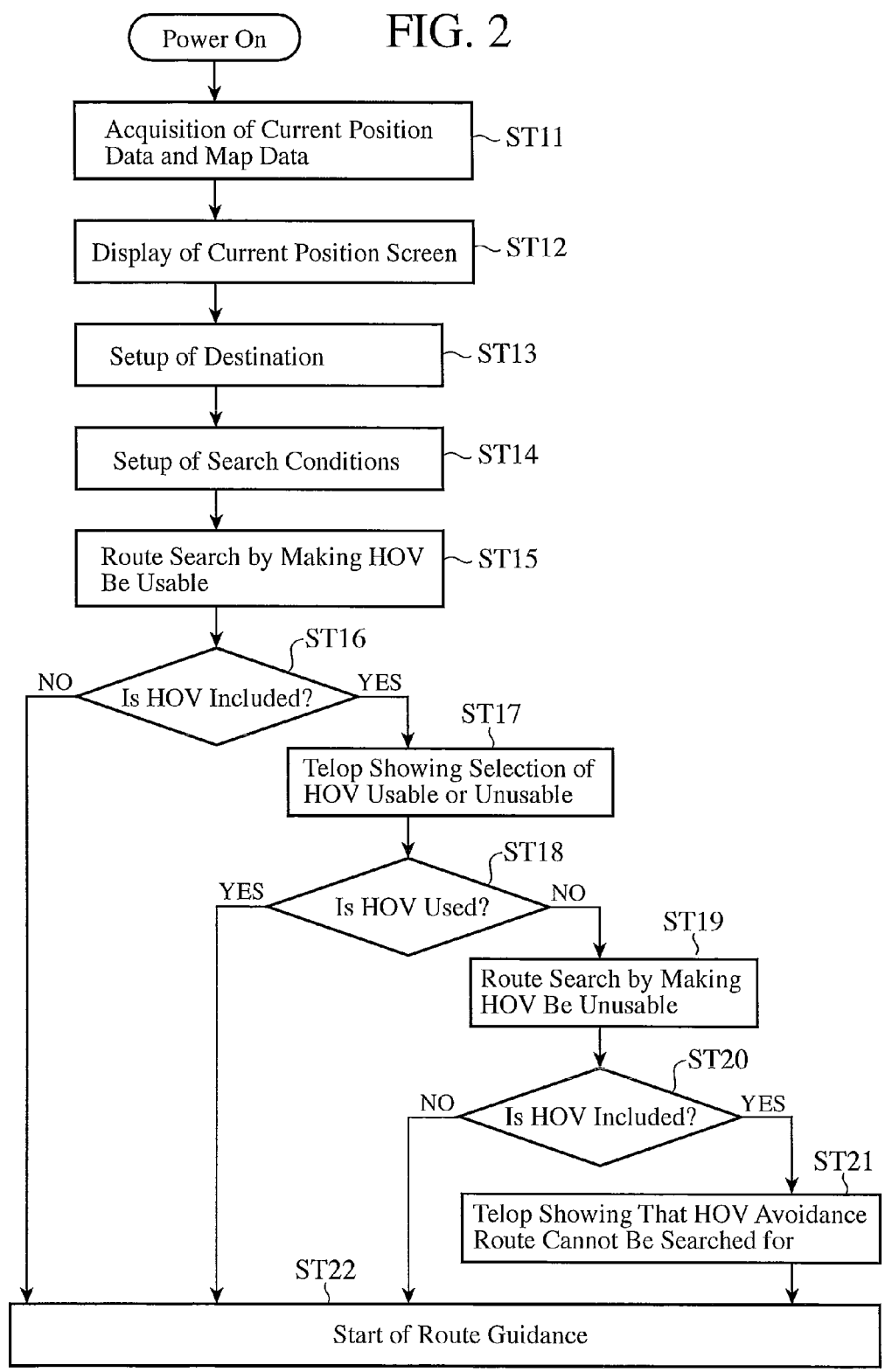
FIG. 2 is a flow chart showing the operation of the navigation apparatus in accordance with Embodiment 1 of the present invention.
Figure 3:
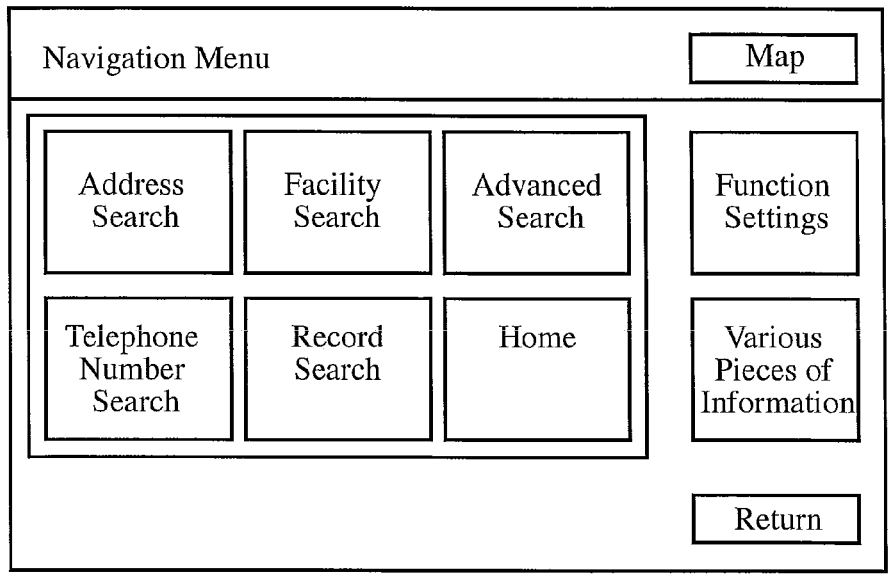
FIG. 3 is a view showing an example of a destination setup screen which is displayed in the navigation apparatus in accordance with Embodiment 1 of the present invention.

Next, the operation of the navigation apparatus which is constructed as mentioned above will be explained focusing on the route searching process of performing a search for a route including a car pool lane with reference to a flow chart shown in FIG. 2, screen display examples shown in FIGS. 3 to 5, and an explanatory drawing of the operation shown in FIG. 6.

When the power supply of the navigation apparatus is switched on, the navigation apparatus acquires the current position data and map data first (step ST11). More specifically, the control unit 10 sends either the current position data acquired from the GPS receiver 13 or the current position data detected with autonomous navigation to the map matching unit 120. Furthermore, the disk drive unit 11 reads map data from the recording medium 11*a* set thereto, and stores them in the map data storage unit 12. The map matching unit 120 carries out a matching process of reading the map data from the map data storage unit 12, and superimposing the vehicle position mark on the map at a position corresponding to the current position data received from the control unit 10. The map data on which this matching process has been performed are sent to the map display unit 110. The map display unit 110 generates drawing data on the basis of the map data sent thereto from the map matching unit 120, and sends the drawing data to the monitor 2 as display data.

A display of a current position screen is then produced (step ST12). More specifically, the monitor 2 draws a map whose center corresponds to the current position of the vehicle on the basis of the display data received from the map display unit 110. Thereby, the map whose center corresponds to the current position of the vehicle shown by the vehicle position mark is displayed, as the current position screen, on the monitor 2.

A setup of a destination is then performed (step ST13). More specifically, when the user performs an operation of instructing the navigation apparatus to set up a destination, the navigation apparatus displays a destination setup screen as shown in FIG. 3 on the monitor 2. In this destination setup screen, portions each enclosed by a rectangle are buttons, and the user is enabled to select a desired button by using the remote control 3 to make the navigation apparatus carry out a function allocated to the button. The same goes for each screen which will be explained hereafter. The user uses the remote control 3 to set up a destination (and a via-place as needed) on the map displayed on the monitor 2 by using an address search, a facility name search, a phone number search, or the like. The monitor 2 sends data showing the destination set up by the user with the remote control 3 to the route searching unit 130 of the navigation unit 1.

A setup of search conditions is then performed (step ST14). More specifically, when a setup of a destination in step ST13 is completed, the navigation apparatus displays a search condition setup screen as shown in FIG. 4 on the monitor 2. The user then sets up conditions for the route search which are displayed on the monitor 2 by using the remote control 3. Concretely, the user sets up a higher-priority search condition by pushing one of a button showing "fastest root", a button showing "shortest route", and a button showing "easy root", the buttons showing higher-priority route conditions, respectively. The user also sets up whether the navigation apparatus can use each of the following items: a highway, a toll road, a ferry, an avoidance route area, and a time-limited road by pushing a "use" button or a "nonuse" button.

Figure 4:
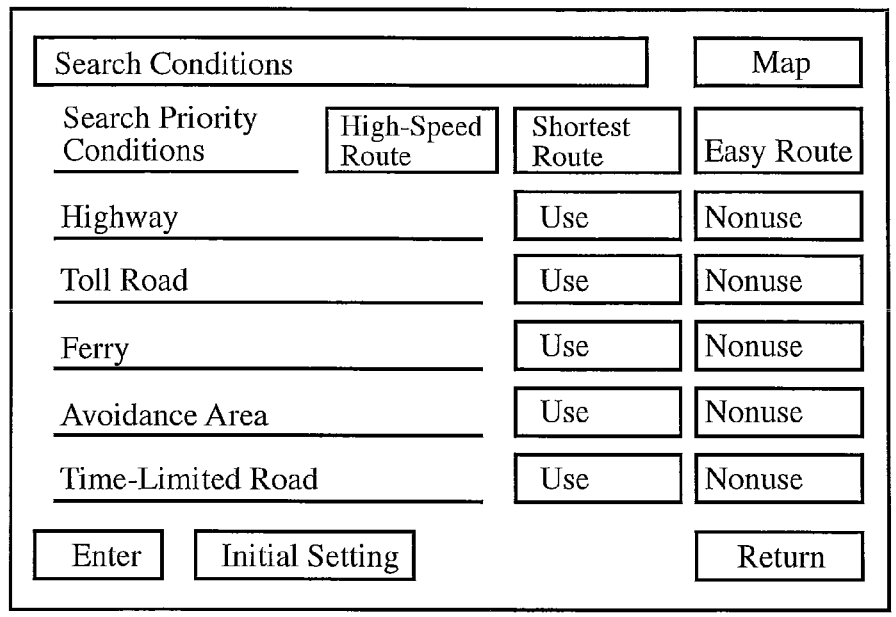
FIG. 4 is a view showing an example of a search condition setup screen which is displayed in the navigation apparatus in accordance with Embodiment 1 of the present invention.

A "map" button in the search condition setup screen shown in FIG. 4 is used in order to return the screen of the monitor 2 to the current position screen, an "enter" button is used in order to make the settings permanent, an "initial setting" button is used in order to return the search conditions to initial ones, and a "return" button is used in order to return the screen of the monitor to the previous screen. When the "enter" button on this search condition setup screen is pushed, the monitor 2 shifts to settings about car pool lanes while sending data showing the set-up search conditions to the route searching unit 130 of the navigation unit 1.

For the settings about car pool lanes, a car pool lane (HOV) setup screen as shown in FIG. 5 is displayed. The user sets up car pool lane use conditions by using this car pool lane setup screen. More specifically, the user sets up the following items: a distance restriction, a distance, the number of lanes, a vehicle type, a setting of days of week, and a time zone setting for each of an "entrance" and an "exit" of a car pool plane as needed. When each of the above-mentioned items is not changed, initial settings are adopted as the car pool lane use conditions.

Concretely, in a case of making a setting for the item of "distance restriction", when imposing a distance restriction, the user pushes a "Yes" button, whereas when not imposing any distance restriction, the user pushes a "No" button. Furthermore, when making settings for the item of "distance", the user sets up both a distance from an entrance of the highway where the car pool lane is also provided to an entrance of the car pool lane, and a distance from an exit of the car pool lane to an exit of the highway where the car pool lane is also provided. The user can change each of the distances by pushing either a button disposed on a left side of the display of each of the distances and having a leftward triangular mark attached thereto, or a button disposed on a right side of the display of each of the distances and having a rightward triangular mark attached thereto. The same goes for each of the other items.

Furthermore, when making a setting for the item of "number of lanes", the user sets up the number of lanes extending from the entrance of the highway which the user uses to the entrance of the car pool lane, or from the exit of the car pool lane to the exit of the highway. In addition, when making a setting for the item of "vehicle type", the user sets up a vehicle type which the user uses (a general vehicle, a bus, a track, an emergency vehicle, a hybrid vehicle, a motorcycle, or the like). Furthermore, when making a setting for the item of "setting of days of the week", the user sets up days of the week on which the user uses the car pool lane. In addition, when making settings for the item of "time zone setting", the user sets up a time zone in which the user uses the car pool lane.

A "map" button in the car pool lane setup screen shown in FIG. 5 is used in order to return the screen of the monitor to the current position screen, an "enter" button is used in order to make the settings permanent, an "initial setting" button is used in order to return the car pool lane use conditions to initial ones, and a "return" button is used in order to return the screen of the monitor to the previous screen. When the "enter button" on this search condition setup screen is pushed, the monitor 2 sends data showing the set-up car pool lane use conditions to the route searching unit 130 of the navigation unit 1. After that, the navigation apparatus advances the sequence to step ST15.

In step ST15, the navigation apparatus carries out a route search by making car pool lanes (HOV) be usable. More specifically, the route searching unit 130 searches for a route from the current position determined by the current position data received from the GPS receiver 13 via the control unit 10 to the destination set up in step ST13 according to the search conditions and the car pool lane use conditions which are set up in step ST14.

In this case, when a car pool lane exists in a route from the current position to the destination, the route searching unit judges whether to use the car pool lane as a recommended route as follows. FIG. 6(*a*) shows routes along each of which the vehicle enters a general purpose lane of a highway from a local street via an entrance of the highway, and then enters a car pool lane, via an entrance of the car pool lane, from the general purpose lane of the highway. In this case, a route along which the vehicle enters the car pool lane from an entrance a of the car pool lane which is located at a distance shorter than a predetermined distance A km from the entrance of the highway (a route shown by an arrow of a thin dashed line) is not adopted as the recommended route, while a route along which the vehicle enters the car pool lane from an entrance b of the car pool lane which is located at a distance equal to or longer than the predetermined distance A km from the entrance of the highway (a route shown by a thick dashed line) is adopted as the recommended route. As a result, because the user does not need to drive the vehicle to cross a plurality of driving lanes during travel over a short distance, the user can drive the vehicle to enter the car pool lane safely.

FIG. 6(*b*) shows routes along each of which the vehicle enters a general purpose lane of a highway from a car pool lane via an exit of the car pool lane, and then goes out of the general purpose lane of the highway to a local street via an exit of the highway. In this case, a route along which the vehicle enters the general purpose lane of the highway from an exit y of the car pool lane located at a distance shorter than a predetermined distance B km to the exit of the highway (a route shown by an arrow of a thin dashed line) is not adopted as the recommended route, while a route along which the vehicle enters the general purpose lane of the highway from an exit x of the car pool lane located at a distance equal to or longer than the predetermined distance B km to the exit of the highway (a route shown by a thick dashed line) is adopted as the recommended route. As a result, because the user does not need to drive the vehicle to cross a plurality of driving lanes while running a short distance, the user can drive the vehicle to go out of the car pool lane safely.

The above-mentioned predetermined distance A km from an entrance of a highway and the above-mentioned predetermined distance B km to an exit of a highway can be changed according to at least one of the number of lanes of the highway, the vehicle type, the days of the week, and the time zone which are set up as the car pool lane use conditions. For example, in a case in which the highway has many lanes, the predetermined distance A km and the predetermined distance B km can be increased, or otherwise the predetermined distance A km and the predetermined distance B km can be decreased. Similarly, in a case in which the set-up vehicle type is a low acceleration vehicle, the predetermined distance A km and the predetermined distance B km can be increased, or otherwise the predetermined distance A km and the predetermined distance B km can be decreased. Similarly, in a case in which the set-up days of the week or time zone is days of the week or a time zone in which a traffic congestion occurs, the predetermined distance A km and the predetermined distance B km can be increased, or otherwise the predetermined distance A km and the predetermined distance B km can be decreased.

When completing the route search in above-mentioned step ST15, the navigation apparatus checks to see whether a car pool lane (HOV) is included in the route acquired through this route search (step ST16). When, in this step ST16, judging that no car pool lane (HOV) is included in the route, the navigation apparatus sends data showing the route acquired through the route search in step ST15 to the map display unit 110 as data showing the recommended route. As a result, the map display unit displays the recommended route acquired through the route search on the monitor 2. After that, the navigation apparatus advances the sequence to step ST22 and starts a route guidance.

When, in above-mentioned step ST16, judging that a car pool lane (HOV) is included in the route, the navigation apparatus then shows a telop for making the user select whether or not the user can use the car pool lane (HOV) (step ST17). The navigation apparatus then checks to see whether the user has made a selection of using the car pool lane (HOV) (step ST18). When, in this step ST18, judging that the user has made a selection of using the car pool lane (HOV), the navigation apparatus sends the data showing the route acquired through the route search in step ST15 to the map display unit 110 as the data showing the recommended route. As a result, the map display unit displays the recommended route acquired through the route search on the monitor 2. After that, the navigation apparatus advances the sequence to step ST22 and starts a route guidance.

When, in above-mentioned step ST18, judging that the user has made a selection of not using the car pool lane (HOV), the navigation apparatus then carries out a route search again by making car pool lanes (HOV) be unusable (step ST19), and further checks to see whether a car pool lane (HOV) is included in the route acquired through the route re-search in step ST19 (step ST20). The reason why the navigation apparatus checks to see whether a car pool lane (HOV) is included in the route acquired through the route re-search is that the navigation has to support a case in which the destination is set up as a point on a car pool lane and a case in which the current position is on a car pool lane.

When, in this step ST20, judging that no car pool lane (HOV) is included in the route acquired through the route re-search, the navigation apparatus sends data showing the route acquired through the route re-search in step ST19 to the map display unit 110 as data showing the recommended route. As a result, the map display unit displays the recommended route acquired through the route re-search on the monitor 2. After that, the navigation apparatus advances the sequence to step ST22 and starts a route guidance.

In contrast, when, in step ST20, judging that a car pool lane (HOV) is included in the route acquired through the route re-search, the navigation apparatus then shows a telop for warning the user that any car pool lane (HOV) avoidance route cannot be searched for (step ST21). In this case, the navigation apparatus sends the data showing the route acquired through the route re-search in step ST19 to the map display unit 110 as the data showing the recommended route. As a result, the map display unit displays the recommended route acquired through the route re-search on the monitor 2. After that, the navigation apparatus advances the sequence to step ST22 and starts a route guidance.

In step ST22, the navigation apparatus starts a route guidance. More specifically, the route guidance unit 140 generates display data showing a guidance message on the basis of the route acquired through the search in step ST15 or step ST19 and sends the display data to the monitor 2, and also generates audio data showing the guidance message and sends the audio data to the audio speaker 4. Thereby, while the guidance message is displayed on the monitor 2, the guidance message is outputted by voice from the audio speaker 4. After that, guidance messages corresponding to the environments which vary as the vehicle travels are outputted in turn.

As explained above, the navigation apparatus in accordance with Embodiment 1 of the present invention is constructed in such a way as to, when a highway where a car pool lane is also provided is included in a route acquired through a route search, present, as a recommended route, the route using the car pool lane if the distance from an entrance of the highway to an entrance of the car pool lane is equal to or longer than a predetermined value, or if the distance from an exit of the car pool lane to an exit of the highway is equal to or longer than a predetermined value. Therefore, when the distance from the entrance of the highway to the entrance of the car pool lane is equal to or longer than the predetermined value, or when the distance from the exit of the car pool lane to the exit of the highway is equal to or longer than the predetermined value, the navigation apparatus does not present the car pool lane as the recommended route. Therefore, because there does not occur a case in which the user drives his or her vehicle to cross a plurality of driving lanes and enter a car pool lane or to go out of a car pool lane during travel of a short distance (a constant distance), as long as the user drives the vehicle along the recommended route, the user can use the car pool lane safely.

INDUSTRIAL APPLICABILITY

As mentioned above, when the distance from an entrance of a road where an HOV lane is also provided (or an exit of the HOV lane) to an entrance of the HOV (or an exit of the road where the HOV lane is also provided) is equal or larger than a predetermined distance, the navigation apparatus in accordance with the present invention can include this HOV lane into the recommendation road. Therefore, because the navigation apparatus in accordance with the present invention does not provide a route along which the user needs to drive his or her vehicle to cross a plurality of driving lanes and enter an HOV lane or to go out of an HOV lane during travel of a short distance, so that the user can use the HOV lane safely, the navigation apparatus in accordance with the present invention is suitable for use in a vehicle-mounted car navigation system and so on.

The invention claimed is:

1. A navigation apparatus comprising:
a map data acquiring unit for acquiring map data including data about roads for which whether or not a car pool lane is also provided is specified;
a current position determining unit for determining a current position;
an input unit for inputting a destination; and
a route searching unit for searching for a route from the current position determined by said current position determining unit to the destination inputted by said input unit on a basis of the map data acquired by said map data acquiring unit, and for, when a road where a car pool lane is also provided is included in a route which said route searching unit has acquired through said search, presenting, as a recommended route, the route using said car pool lane if a distance from an entrance of said road to an entrance of said car pool lane is equal to or longer than a predetermined value which is determined according to a number of lanes of said road, wherein the predetermined value can be changed based on a car pool lane use condition other than the number of lanes, wherein the car pool lane use condition is a vehicle type.

2. A navigation apparatus comprising:
a map data acquiring unit for acquiring map data including data about roads for which whether or not a car pool lane is also provided is specified;
a current position determining unit for determining a current position;
an input unit for inputting a destination; and
a route searching unit for searching for a route from the current position determined by said current position determining unit to the destination inputted by said input unit on a basis of the map data acquired by said map data acquiring unit, and for, when a road where a car pool lane is also provided is included in a route which said route searching unit has acquired through said search, presenting, as a recommended route, the route using said car pool lane if a distance from an entrance of said road to an entrance of said car pool lane is equal to or longer than a predetermined value which is determined according to a number of lanes of said road, wherein the predetermined value can be changed based on a car pool lane use condition other than the number of lanes, wherein the car pool lane use condition is at least one of a day of a week and a time period.

3. A navigation apparatus, comprising:
a map data acquiring unit for acquiring map data including data about roads for which whether or not a car pool lane is also provided is specified;
a current position determining unit for determining a current position;
an input unit for inputting a destination; and
a route searching unit for searching for a route from the current position determined by said current position determining unit to the destination inputted by said input unit on a basis of the map data acquired by said map data acquiring unit, and for, when a road where a car pool lane is also provided is included in a route which said route searching unit has acquired through said search, presenting, as a recommended route, the route using said car pool lane if a distance from an entrance of said road to an entrance of said car pool lane is equal to or longer than a predetermined value which is determined according to a number of lanes of said road,
wherein the predetermined value can be changed based on a car pool lane use condition other than the number of lanes; and
a unit for setting the predetermined value.

* * * * *